United States Patent
Cook et al.

(10) Patent No.: US 6,686,831 B2
(45) Date of Patent: Feb. 3, 2004

(54) VARIABLE POWER CONTROL FOR PROCESS CONTROL INSTRUMENTS

(75) Inventors: Warren E. Cook, Taunton, MA (US); Vladimir Kostadinov, Sharon, MA (US)

(73) Assignee: Invensys Systems, Inc., Foxboro, MA (US)

( * ) Notice: Subject to any disclaimer, the term of this patent is extended or adjusted under 35 U.S.C. 154(b) by 75 days.

(21) Appl. No.: 09/954,205

(22) Filed: Sep. 18, 2001

(65) Prior Publication Data

US 2002/0097031 A1 Jul. 25, 2002

Related U.S. Application Data

(60) Provisional application No. 60/263,185, filed on Jan. 23, 2001.

(51) Int. Cl.[7] .............................................. H04M 11/04
(52) U.S. Cl. .................................. 340/310.01; 323/273
(58) Field of Search ................................. 323/266, 268, 323/273, 275; 340/310.01, 310.02, 310.06, 825.77

(56) References Cited

U.S. PATENT DOCUMENTS

| | | |
|---|---|---|
| 4,418,333 A | 11/1983 | Schwarzbach et al. |
| 4,918,690 A | 4/1990 | Markkula, Jr. et al. |
| 5,045,774 A | 9/1991 | Bromberg |
| 5,160,924 A | 11/1992 | Jean-Pierre et al. |
| 5,390,132 A | 2/1995 | Shioe et al. |
| 5,668,537 A | 9/1997 | Chansky et al. |
| 5,754,767 A | 5/1998 | Ruiz |
| 5,841,360 A | 11/1998 | Binder |
| 5,942,814 A | 8/1999 | Sutterlin et al. |
| 5,949,974 A * | 9/1999 | Ewing et al. ........... 395/200.32 |
| 6,037,857 A * | 3/2000 | Behrens et al. ........ 340/310.03 |
| 6,055,633 A | 4/2000 | Schrier et al. |
| 6,218,930 B1 | 4/2001 | Katzenberg et al. |
| 6,459,363 B1 * | 10/2002 | Walker et al. ......... 340/310.03 |

OTHER PUBLICATIONS

G.G. Wood, The Foxboro Company, Redhill, Survey, RH1 2HL UK, Survey of LANs and Standards, 1987, Elsevier Science Pulbishers B.V. (North–Holland).

* cited by examiner

*Primary Examiner*—Matthew V. Nguyen
(74) *Attorney, Agent, or Firm*—Fish & Richardson P.C.

(57) ABSTRACT

A process control instrument includes a sensor/actuator portion and a transmitter portion connected to the sensor/actuator portion. The transmitter portion is operable to communicate with other process variable transmitters through a communication network. The transmitter includes a processing module and a power module operable to generate a power output supplied to at least the transmitter portion, wherein the power module is operable to adjust the power output based on a power control signal. Moreover, the power control signal may be generated by a controller device remote from the process control instrument and communicated to the process control instrument over the communication network. Additionally, the power module includes a power control module for adjusting the power output. This power control module includes an amplitude limiter operable to limit a power input to the process control instrument according to a controllable amplitude limit, and a power rate of change unit operable to limit a rate of change of the power input to the process control instrument according to a controllable adjustment rate limit.

66 Claims, 8 Drawing Sheets

*700*

Task-Power relationship

| Task ID | Δ Power |
|---|---|
| 705 — 1-second looped sensor reading update | 2 mW |
| 710 — 0.5-seconds looped sensor reading update | 3.5 mW |
| 715 — Transmit data of sensor | 5 mW |
| 720 — Upgrade software of instrument | 4 mW |
| 725 — Process control function block (e.g., PID) | 10 mW |
| 730 — Add new hardware (e.g., sensor) | 5 mW |
| 735 — Increase processing rate of task "X" | 2-5 mW |

FIG. 7

VARIABLE POWER CONTROL FOR PROCESS CONTROL INSTRUMENTS

CROSS-REFERENCE TO RELATED APPLICATIONS

This application claims priority from U.S. Provisional Application No. 60/263,185, filed Jan. 23, 2001, and titled VARIABLE POWER CONTROL FOR FIELDBUS TRANSMITTER, which is incorporated by reference.

TECHNICAL FIELD

This invention generally relates to a power controller for a transmitter of a digital or analog process control device.

BACKGROUND

Industrial control systems have evolved into complex computer-controlled networks that facilitate communication and control among, for example, one or more central control interfaces and field devices. A central control interface can be used to coordinate communications and control of an entire process, or it can be used to control a portion of a larger, distributed computerized process control system. In some cases, the process field devices and related machinery (e.g., pumps, valves and heaters) that form the process control system can occupy spaces large enough to be measured in square miles. Accordingly, the field devices and machinery require highly integrated control.

Generally, field devices are used to monitor the process being controlled, and to provide feedback for and adjustment of that process. Field devices also may be used to control the entire process and coordinate communications, without a central control interface/station. Field devices may include sensor-type field devices for sensing variables of a process, or control-type field devices (e.g., positioners and actuators) for controlling parameters of a process. Sensor-type field devices such as temperature sensors and flowmeters measure process variables and may communicate their measurements to the central control interface for monitoring and possible process adjustment. Control-type field devices such as pumps and valves may be controlled by the central control interface, or a control-functioning field device or devices, in real time to adjust control of the process. The adjustment of the field devices may be automatically controlled by a computer running process control software, or manually controlled by, for example, process engineers and factory personnel.

In many cases, field devices and central control interfaces communicate with each other using a communication network, such as a local area network (LAN). Generally, each device (field devices and central control interfaces) connected to the communication network includes a transmitter for sending and receiving data in the form of electrical signals. These signals, depending on the communication network, can include, for example, analog, digital and pulsed signals. The communication network may be used to transmit control signals and sensor signals among the various components of the process control system. Furthermore, the communication network facilitates monitoring and diagnostics of the process control system components and the process itself.

Various aspects of the process control system may follow a proprietary protocol or may follow a widely-accepted standard developed by process control industry participants. These protocols/standards may specify process control system parameters such as communications protocol (e.g., bit rate of data transmission), power consumption, length of the communication bus, and safety measures. These protocols/standards provide many benefits for process control systems including coordination of field devices, safety provisions, and, in the case of widely-accepted standards, compatibility and interchangeability of components.

SUMMARY

In one implementation the process control instrument includes a sensor/actuator portion and a transmitter portion connected to the sensor/actuator portion and operable to communicate with other process variable transmitters through a communication network. The transmitter may include a processing module and a power module operable to generate a power output supplied to at least the transmitter portion, wherein the power module is operable to adjust the power output based on a power control signal. Moreover, the power control signal may be generated by a controller device remote from the process control instrument and communicated to the process control instrument over the communication network. The power output of the power module may be an electric current supplied to at least the transmitter portion of the process control instrument.

Additionally, the power module may include a power control module for adjusting the power output. This power control module may include an amplitude limiter operable to limit a power input to the process control instrument according to a controllable amplitude limit, and a power rate of change unit operable to limit a rate of change of the power input to the process control instrument according to a controllable adjustment rate limit. The controllable amplitude limit may be automatically controlled by software and/or circuitry, and/or controlled by human intervention. Also, the controllable adjustment rate limit may be automatically controlled by software, human intervention, and/or circuitry. Furthermore, the controllable adjustment rate limit may equal 1 mA/ms.

In addition, the communication network may include a hard-wired communication pathway operable to supply a bus power to the power module, and the power module may use the bus power as a source for the power output. The hard-wired communication pathway may be configured in a bus-with-spurs topology, a daisy-chain topology, a tree topology, and/or a point-to-point topology.

In another implementation, a process control system may include process control instruments, each of which may include a power control module that controls an available power level for the process control instrument, wherein the power control module is operable to adjust the available power level based on a power control signal. The process control system may further include a communication network electrically connected to the process control instruments and operable to conduct communication signals among the process control instruments, and a power supply operable to supply power to the process control instruments through the communication network. Further, the power controlled by the power control module may be electric current.

The process control system may further include a control station operable to generate the power control signal and control power distribution among the process control instruments. The control station may be further operable to determine power loads of the process control instruments and distribute functions among the process control instruments to balance the power loads of the process control instruments. Moreover, the control station may distribute functions among the process control instruments to balance power consumption among at least one of individual process control instruments, groups of process control instruments, and segments of the communication network. Also, the control station may be further operable to control power distribution of a limited quantity of power among the process control instruments.

In addition, the power control module may include an amplitude limiter operable to limit the available power level of the process control instrument according to a controllable amplitude limit, and a power rate of change unit operable to limit a rate of change of the available power level of the process control instrument according to a controllable adjustment rate limit. The controllable amplitude limit may be automatically controlled by software and/or circuitry, and/or controlled by human intervention. Also, the controllable adjustment rate limit may be automatically controlled by software and/or circuitry, and/or controlled by human intervention. Moreover, the controllable adjustment rate limit may equal 1 mA/ms.

Additionally, the communication network may include a hard-wired communication pathway operable to supply a bus power to the power control module, and the power control module may use the bus power as a source for the available power level. The hard-wired communication pathway may be configured in a bus-with-spurs topology, a daisy-chain topology, a tree topology, and/or a point-to-point topology.

One particular implementation of a method for managing power of a process control system may include determining initial power requirements of power-consuming functions distributed among process control instruments, which are electrically connected together by a network. The method may further include determining initial power loads of the process control instruments, and determining an available power level supplied by a power supply connected to the network. Also, the method may include distributing the power-consuming functions among the process control instruments, based on at least one of the initial power requirements, the initial power loads, and the available power level, to balance the power loads among the process control instruments. Distribution of the power-consuming functions among the process control instruments may be achieved using a control station connected to the network.

The process control system power management method may further include determining line losses of network branches connecting the process control instruments. Moreover, distribution of the power-consuming functions among the process control instruments may be based on the line losses of network branches.

Additionally, distributing the power-consuming functions among the process control instruments may include producing a balance of power loads with respect to individual process control instruments, producing a balance of power loads with respect to segments of the network, and/or producing a balance of power loads with respect to a limited amount of power supplied by the power supply.

Another implementation of a power management method of a process control system may include determining initial power requirements of power-consuming functions distributed among process control instruments which are electrically connected together by a network, determining initial power loads of the process control instruments, and determining an available power level supplied by a power supply connected to the network. The power management method also my include controlling power control modules associated with the process control instruments, based on at least one of the initial power requirements, the initial power loads, and the available power level, to adjust a power level available to individual process control instruments and balance the power loads among the process control instruments. Control of the power control modules associated with the process control instruments may be achieved using a control station connected to the network.

The process control system power management method may further include determining line losses of network branches connecting the process control instruments. Moreover, control of the power control modules associated with the process control instruments may be based on the line losses of network branches.

Additionally, control of the power control modules associated with the process control instruments may include producing a balance of power loads with respect to individual process control instruments, producing a balance of power loads with respect to segments of the network, and/or producing a balance of power loads with respect to a limited amount of power supplied by the power supply.

Accordingly, the process control instruments can be used with various standards/protocols of the process control industry while realizing improved coordination and control of the process control instruments with respect to, for example, power limitations specified by the standards/protocols.

The details of one or more implementations are set forth in the accompanying drawings and the description below. Other features and advantages will be apparent from the description and drawings, and from the claims.

DESCRIPTION OF DRAWINGS

FIG. 7 is a chart showing a relationship between instrument functions and power consumption.

Like reference symbols in the various drawings indicate like elements.

DETAILED DESCRIPTION

Figure 1:
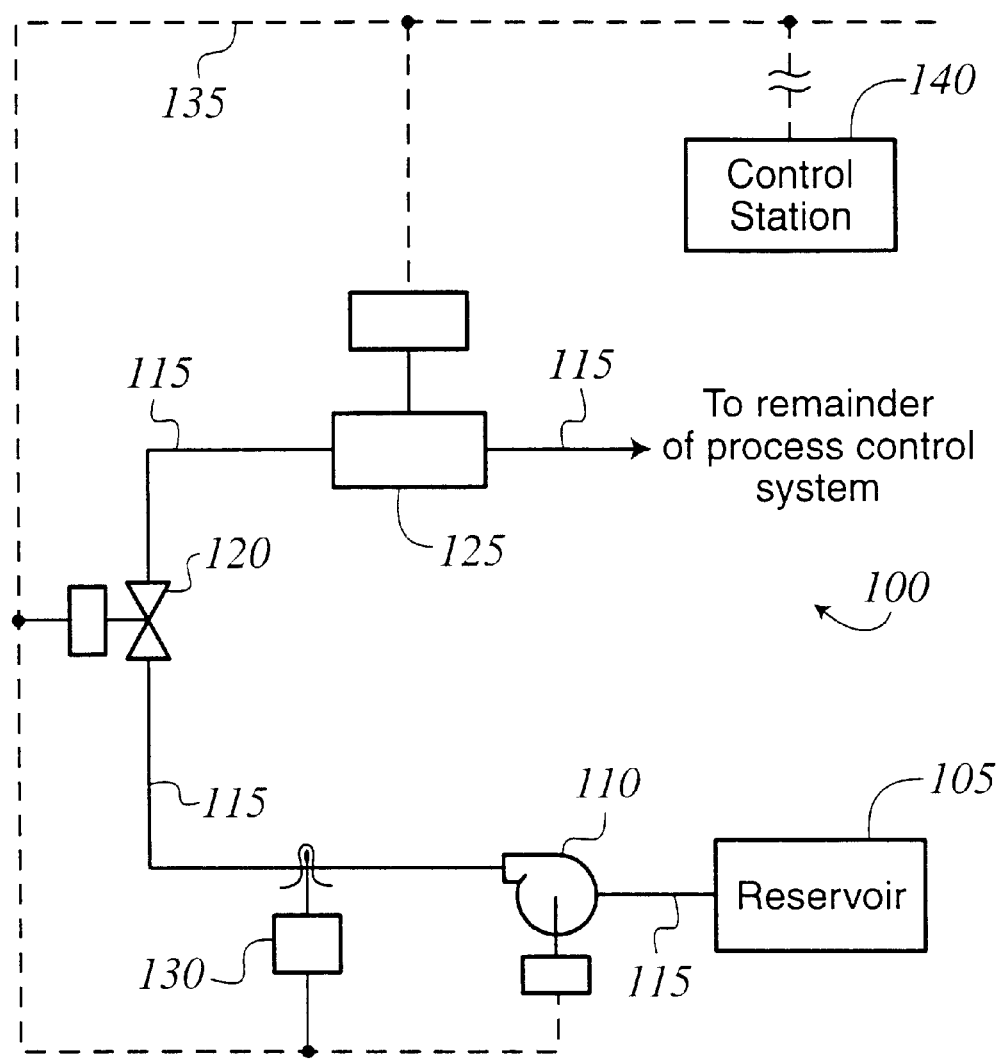
FIG. 1 is a block diagram of a process control system.

The description set forth below is applicable to digital and analog implementations of process control system instruments. It should be noted that process control systems described herein can be used in process and manufacturing automation applications. Further, "transmitter" is used generally to indicate a communication and processing portion of a field device, capable of transmitting and receiving communications and control of the field device and/or other devices of the process control system.

Process control systems (e.g., for control of factory manufacturing and/or processing operations) often use a control system of distributed sensors and actuators to monitor and control operations like food, chemical or materials processing. Sensors monitor, for example, flow rate, pressure and temperature of processed materials, while actuators, for example, control the opening of valves and the regulation of heat. A factory processing operation may rely on hundreds, or even thousands, of such sensors and actuators, with the sensors and actuators distributed throughout the factory process site.

Typically, each of the process control system's distributed instruments (e.g., sensors and actuators) is connected to each other, and optionally connected to a control station or stations, in the factory, by way of a communication pathway (e.g., an electrical link). Other types of instruments (e.g., a controller) without process sensors or actuators may be connected to the process control system. The communication functions in the instrument provides for communication of process information among the sensors, actuators and the optional control station(s). Further, the instrument may be implemented by hardware or software or a combination of both. The term "transmitter" may be used interchangeably throughout the following description to refer to the combination of a sensor/actuator and its corresponding processing/communications interface. Moreover, the term "instrument" may be used interchangeably throughout the following description to refer to the combination of a sensor/actuator and its corresponding processing/communications interface. While technically a "transmitter" is a communication device, in the process control industry, the term "transmitter" has come to mean the entire field device (e.g., "temperature transmitter") including, for example, the sensor/actuator, the signal processor, and the communication interface. The terms "control station" and "central control station" will be used throughout the following description to refer to a communications control unit and/or operator interface, which may control the process instruments and communication among the instruments. The control station may control process operations as well as communications, and the control station may be one of many control stations connected to the entire process control system. Further, as stated above, the process control system can function without any control stations, whereby control of the process control system may be performed by any one or more of the instruments connected to the process control system communication pathway.

Communication on the bus may require that each transmitter be identified by a unique identifier. This identifier represents an identification number (ID), but could represent other identifiers (e.g., an identification name or location). The ID may be assigned to a transmitter at the time of its manufacture, and may represent, for example, the transmitter serial number, the date the device was manufactured, and the type of device (e.g., pressure sensor). Once assigned, the ID may be encoded and stored electronically in a memory module (e.g., EEPROM) of the transmitter for future reference. The ID facilitates incorporation of the device into the process control system, as the device can be quickly identified by the process control system after the device is connected to the bus. It should be noted that there are other techniques of uniquely identifying the instruments connected to the network of the process control system, and these identification methods can be permanent or dynamic.

An additional identification scheme may be used in the process control system to provide a user-recognizable transmitter identifier. In this scheme, an operator may assign a tag number or device name to a transmitter when it is commissioned into the process control system (to further identify, for example, the location of the device). Such a commissioning procedure might typically include calibrating the transmitter for its intended sensing/actuating functions, assigning a tag number or device name, and initializing the transmitter's data collection and storage functions.

Often, many sensors and actuators share a particular communication pathway, which may be referred to as a bus. Separate buses may be strung throughout the factory, depending on the number of actuators and sensors and their physical distribution. The central control station communicates with the sensor and actuator transmitters across the communication pathway to command their operations and monitor their status. For example, the closure of a valve in a sensed high flow rate situation may be commanded by the central control station across the process control system communication pathway to the transmitter corresponding to the valve actuator.

The bus in a factory setting often is implemented by a very sophisticated system of cables. The bus may be implemented by sets of two-wire, 4–20 mA communication links. Alternatively, the communication pathway may be implemented by a wireless communication system. Regardless of the implementation of the communication pathway, actual communication among the transmitters and central control station generally occurs in accordance with standardized communication protocols.

A standardized communication protocol (which may include standards for various component and configuration specifications of the process control system) may follow a standardized set of guidelines developed by, for example, process control industry participants. One benefit of an international standard for process control equipment is the compatibility and interchangeability of components.

One such communications protocol that has gained international acceptance is the FOUNDATION™ Fieldbus communication standard. Another communication standard that has gained international acceptance is PROFIBUS™. The FOUNDATION™ Fieldbus is an all-digital, serial, two-way communication system that operates as a local area network ("LAN") for process control systems. The FOUNDATION™ Fieldbus communication standard has the ability to distribute the control application across the network of the process control system so as to allow more decentralized, distributed control in the field (e.g., at various positions on a factory floor). While the following description may at times be discussed with respect to the FOUNDATION™ Fieldbus communication protocol, it should be understood that this discussion applies to various other methods and protocols used to implement process control systems.

Furthermore, while the transmitters are generally managed by a single "master" controller connected to the bus, the FOUNDATION™ Fieldbus protocol provides that any transmitter connected to the bus can manage the other devices on the bus (e.g., in the event the original controller fails). Moreover, the FOUNDATION™ Fieldbus protocol specifies a bit rate for digital communication.

One feature of the FOUNDATION™ Fieldbus and the PROFIBUS™ protocols is that the instruments of the process control system may be capable of controlling the process. And, if the controlling instrument should fail for some reason, another instrument of the process control system is capable of taking over the control of the process. This control includes, for example, communications, scheduling and prioritizing information relayed on the bus. In this manner, the process control system can operate without a central control station.

Turning now to the figures, FIG. 1 illustrates a simplified process control system 100, which is one implementation in which the devices equipped with transmitters can be used. The process control system 100 may include, for example, a reservoir 105, a pump (e.g., a centrifugal pump) 110, conduit portions 115 (e.g., pipes having a 2 inch diameter), a controllable valve 120 to control a flow rate of material through the conduit portions 115, a flowmeter 125, and a temperature sensor 130. Various other process control devices may be included in the process control system 100, depending on the specific process control application. It should be understood that the process control system 100 may be implemented in many configurations (other than material moving through a conduit) such as, for example, conveyor belt processes, robotic automation processes, and other manufacturing and industrial processes.

Furthermore, the process control system 100 may include a network 135 (e.g., a bus) for facilitating the monitoring and controlling of the various devices of the process control system 100. Moreover, the process control system 100 may include an optional control station 140 for centralized monitoring and control of the process control system 100. The network 135 may further facilitate communication among the various devices of the process control system. Note that the term "network" used in the present description includes typical bus communication and power supply networks.

While the control station 140 and other control stations depicted in the figures are shown directly linked to the network 135, the link may include more interconnections than shown. For example, the network 135 may be a two-wire communication configuration (such as the type used in process control systems), connected to a controller or interface card, which in turn may be connected to an Ethernet based communication system to which the control station 140 may be connected. Furthermore, the control station 140 and other control stations depicted in the figures may be a computer or a field-mounted controller or fieldbus I/O module having built in control functions.

In the simplified implementation depicted in FIG. 1, the process control system 100 may provide typical feedback control of a process. For example, the pump 110 may be controlled (e.g., from a signal generated at the control station 140) to pump the material through the conduit portions 115 at a rate that depends on the measured flow rate sensed by the flowmeter 125. The flowmeter 125 may output to the control station 140 a signal representing the flow rate of the material through the conduit portions 115. Accordingly, the control station 140 may control the pump 110 based on the programmed parameters for controlling and monitoring the specific process control system 100.

Figure 2:
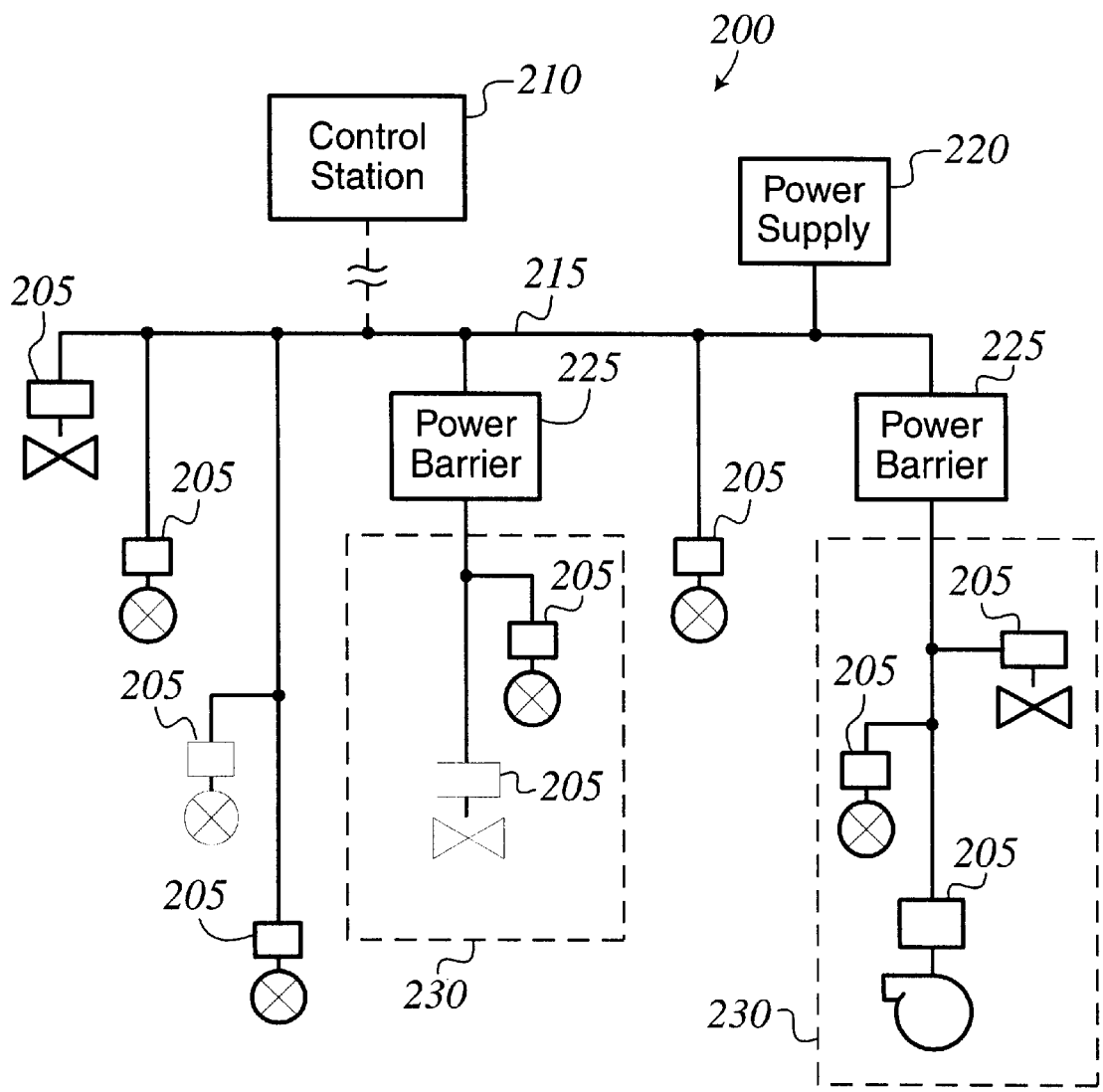
FIG. 2 is a block diagram of a plant-wide network implementing the process control system of FIG. 1.

FIG. 2 shows an exemplary plant-wide process control system 200 including field devices 205 for monitoring/controlling the process, a control station 210 that may provide a centralized monitoring/controlling station for overseeing the entire process control system 200, and a network 215 that communicatively connects the field devices 205 and the control station 210 with each other.

The field devices 205 may be field devices for sensing and/or controlling various parameters of the process being controlled by the process control system 200. These field devices 205 represent field devices such as temperature, pressure and flow sensors, and pump, valve and boiler actuators/controls. Particular implementations of the field devices 205 will be discussed in greater detail below.

The network 215 can be implemented using a typical two-wire communication configuration (e.g., twisted pair connections). The network 215 may include copper wire, optical fiber, or any suitable connection media. In another implementation, the network 215 can be wireless. The network 215 can provide analog (e.g. 4–20 mA signals), digital, and/or pulse output communications among the various field devices 205 connected to it. As discussed above, communication over the network 215 may follow a particular protocol such as the FOUNDATION™ Fieldbus communication protocol or PROFIBUS™ PA (process automation) protocol. Digital communications following the FOUNDATION™ Fieldbus or the PROFIBUS™ PA communication protocols may take place at, for example, 31.25 kbit/s, 1.0 Mbit/s, or 2.5 Mbit/s communication speeds.

The network 215, at least when implemented in a wired configuration, may provide power to connected field devices 205. These field devices 205 that are powered by the network 215 are known as bus-powered devices. As shown in FIG. 2, power supply 220 may be connected to the network 215 to supply power to the field devices 205. Providing both power and communication to the field devices 205 may present certain difficulties for the network 215. For example, power spikes and load variations will introduce noise into the network 215 that could adversely affect communications. Accordingly, the network 215 may be managed carefully, for example, by the control station 210, to avoid any such problems.

The control station 210 may be provided for remote monitoring and control of the field devices 205 connected to the network 215. The control station 210 may include a computer workstation with software and a graphical user interface for facilitating interaction between human operators and the process control system 200.

Depending on the configuration of the process control system 200, the control station 210 may perform centralized process control (e.g., monitoring, calculations and adjustments) or management of distributed process control (e.g., monitoring and adjustment of distributed controllers that individually monitor, calculate, and adjust portion of the overall process control system 200). The control station 210 may coordinate transmission times for all of the field devices 205 communicating on the network 215. Moreover, the control station 210 may provide/coordinate safety, diagnostic and maintenance functions for the process control system 200. Additionally, the control station 210 may provide an overall picture of the process control system 200 for the benefit of the factory personnel and process engineers. Again, these functions may be performed by a field instrument or instruments, without a control station 210, depending on the control topology of the process control system 200.

The control station 210 may poll the individual field devices 205 connected to the network 215 and establish priorities among the field devices 205. For example, a critical portion of the process may require monitoring and feedback adjustment every 0.5 seconds while a less-critical portion of the process may require monitoring at 5-minute intervals. As such, the control station 210 may adjust the communication schedule so that the critical portion field devices 205 can communicate over the network 215 more often than the less-critical portion field devices 205.

Furthermore, as shown in FIG. 2, the process control system 200 may require additional safety components such as, for example, a power barrier 225, which can limit the power on the network branch 230 to which it is connected. For example, in a gasoline processing facility, it may be important to restrict the amount of power carried by the network branch 230 if the network branch is physically installed proximate to highly flammable substances. Excessive power on the network branch 230 could lead to a spark, which could cause an explosion. Accordingly, the power barrier 225 may be provided on the network 215 to limit the power in the network branch 230 to safe levels.

Even though FIG. 2 shows only two power barriers 225, there may be other power barriers installed on the process control system 200. Moreover, each power barrier 225 may be passive (e.g., it may simply limit the power passing from the power supply 220 to the network branch 230), or it may be active. An active power barrier may include a separate power supply for supplying the limited power to the network branch 230. In this case, the power from the power supply 220 may be isolated from the network branch 230, thereby allowing the power supply 220 to provide its power to other areas of the process control system 200. In other words, network branch 230 will not be a drain on the power supplied by power supply 220.

Additionally, depending on the configuration of the process control system 200, other power supplies 220 may be connected to the network 215 to supply the field devices 205. In a process control system 200 with a limited number of power supplies 220, and in particular, on a network branch 230 whose power is limited by a power barrier 225, there exists a limited supply of power from which the field devices 205 may draw their operating power (if the power for the field devices 205 is indeed supplied by the network 215). Accordingly, the field devices 205 should be designed to operate at low power consumption levels, and further, the field devices 205 of a particular process control system 200 or network branch 230 should be selected to operate within the available power budget. The sum of the power consumed by the field devices 205 connected to the network 215 should not exceed a rated power level and/or the power available on the network 215. Accordingly, power management during design and operation of the process control system 200 is very important.

For example, if the power barrier 225 limits the power available on the network branch 230 to 80 mA, then the current consumed by the field devices 205 connected to the network branch 230 must be less than 80 mA. In a properly designed system, there will be some extra power available for use by the field devices 205 in each power-limited network 200 or network branch 230. In other words, the current consumed by the field devices 205 connected to the network branch 230 should be designed to consume a certain level less than 80 mA, in this example.

Also, regarding power consumption of the network 215, the voltage drop due to the resistance of the wires/cables of network 215 should be considered. If a branch of the network 215 is particularly long, then the power available to field devices 205 at the end of that branch will be decreased due to line losses of the network 215.

It should be recognized that the above-described process control system 200 can include additional sensors, actuators, transmitters, power supplies, control stations, and various other process control devices. Additionally, the networks 135 and 215 shown in FIGS. 1 and 2, respectively, may include network components such as, for example, terminators, I/O interfaces and junction boxes, which are omitted here for the sake of simplicity. Further, while the networks 135 and 215 are shown as multi-drop configurations (bus with spurs), it will be understood that various other configurations can be used. For example, topologies such as point-to-point, daisy chain, tree, and combinations thereof may be used to implement the networks 135 and 215.

Figure 3:
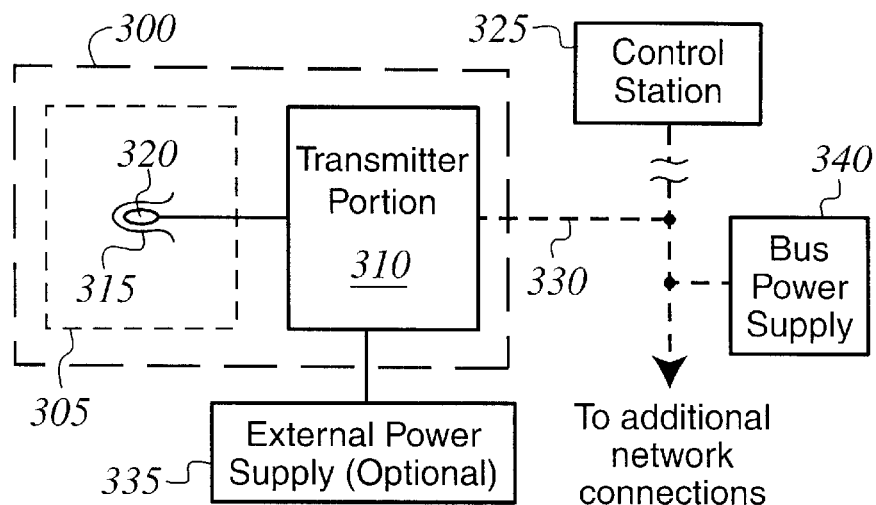
FIG. 3 is a block diagram of a field device of the system of FIG. 1.

FIG. 3 illustrates an exemplary implementation of a field device 300 having a sensor/actuator portion 305 and a transmitter portion 310. The sensor/actuator portion 305 may include a housing 315 for installation in and integration with the process environment being controlled. Additionally, the sensor/actuator portion 305 may include a sensor/actuator 320 for sensing the process environment variable or controlling a control device (e.g., a pump or valve) acting on the process environment. For purposes of this discussion, the field device 300 is shown in FIG. 3 as a temperature sensing device. The housing 315 shown here can be inserted into, for example, a pipe (e.g., conduit portions 115 of FIG. 1) through which the material being processed flows.

The transmitter portion 310 may include electronics for filtering and processing the signal received from the sensor/actuator portion 305. The transmitter portion 310 may be implemented using one or more of, for example, a digital signal processor (DSP), a field-programmable gate array, an ASIC, other programmable logic or gate arrays, or programmable logic with a processor core. The transmitter portion 310 generates an output signal for transmission to the control station 325 over the network 330 based at least on signals received from the sensor/actuator portion 305. Also, the transmitter portion 310 may include electronics for transmitting data over the network 330 and communicating with other devices. The transmitter portion 310 can include electronics capable of filtering, processing, and transmitting/receiving digital and/or analog signals. The transmitter portion 310 may also make decisions based on the processing performed within the transmitter portion 310.

The field device 300 may be provided with its own power supply 335, or the field device 300 may draw operating power from the network 330. A bus power supply 340 may be connected to the network 330 in the same way as a field device (or other communication device) for supplying power to the field device 300, as discussed above with reference to FIG. 2.

If the process control system 200 and the field device 300 are designed according to certain standards for process control equipment, for example, the FOUNDATION™ Fieldbus protocol, then various design parameters of the process control system 200 and the field device 300 will typically fall within predetermined criteria. For example, the minimum and maximum power consumption, the communication protocol, and the physical construction of the field device 300 may be specified. In more detail, the Fieldbus-based implementation may require the network 330 to provide a minimum power to each field device 300 connected to the network 330. The minimum power supply to each field device 300 may be specified to ensure proper start-up and functionality of the field device 300. Moreover, the fieldbus protocol specification may require that any changes to power consumed by the field device 300 must not vary more than 1 mA/ms. As such, the power supplied to and consumed by the field device 300 may be closely monitored and regulated by, for example, the transmitter portion 310.

One of the power-consuming operations of the transmitter portion 310 concerns executing the processing functions associated with the field device 300. Processing functions (hereinafter referred to as "functions" or "tasks") can include, for example, software routines in a microprocessor, digital circuitry functions and analog circuitry functions. One example of a processing function is a PID (proportional-integral-derivative) control function for controlling a device or devices of the process control system. The PID control function may control a single device, a group of devices, or the entire process control system 210. Further, the PID control function can be processed by, for example, a single field instrument 300 or the optional central control station 210.

Certain amounts or levels of power may be required to process certain functions. For example, the PID control function is a computationally intensive function that likely requires a relatively large amount of power to perform. Depending on the number and types of functions being processed by the transmitter portion 310, each field device 300 may require a different level of power to complete its assigned functions. Accordingly, individual power management for each transmitter portion 310 of each field device 300 is important. The relationship between functions (or tasks) and their power requirements will be discussed in greater detail below with reference to FIG. 7.

Figure 4:
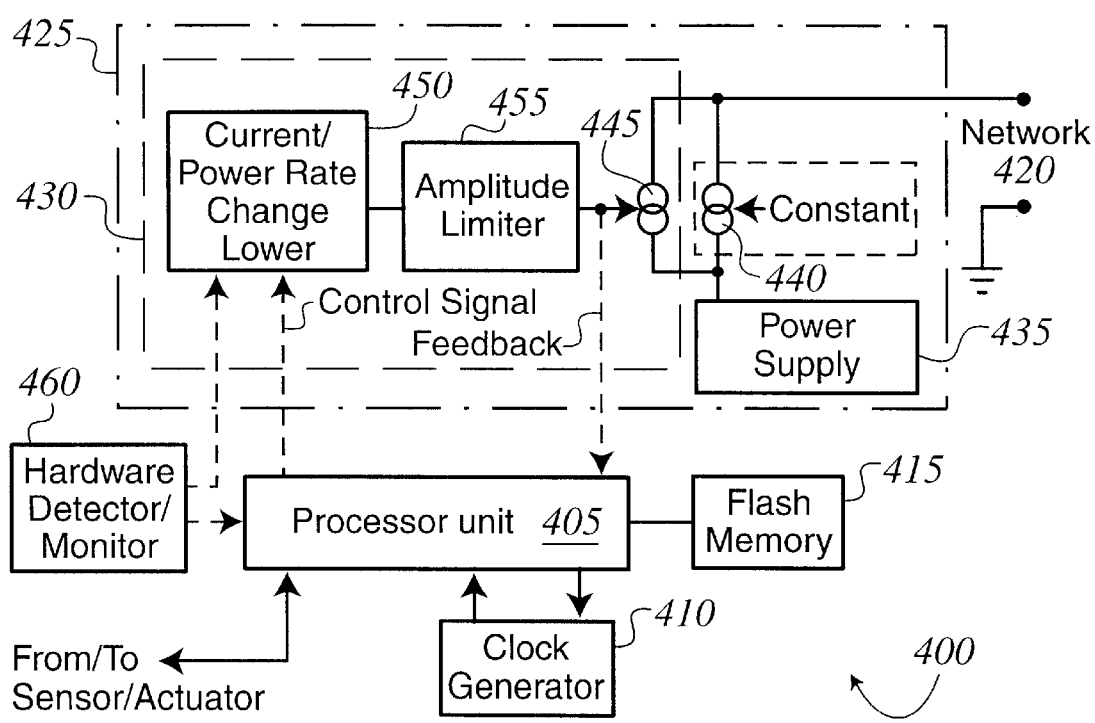
FIG. 4 is a block diagram of a transmitter portion of the field device of FIG. 3.

FIG. 4 shows a more detailed implementation of a instrument 400 (e.g., the transmitter portion 310 of FIG. 3). The instrument 400 may include a processor unit 405, which can be implemented by a programmable microprocessor chip. The instrument 400 also may include a clock generator 410 for controlling the processing speed of the processor unit 405, and a flash memory 415 for storing data and/or software for controlling the processor unit 405. In some cases, the clock generator 410 may be physically part of the processor unit 405. The processor unit 405 may be capable of processing the signals from/for the sensor/actuator portion 305 of the field device 300. Further, the processor unit 405 may be capable of preparing and transmitting data over the network 420, and receiving and processing data from the network 420.

In one implementation, the processor unit 405 of the instrument 400 can be programmed with, for example, a handheld or portable field controller in the field, a factory computer during manufacture of the instrument 400, or through the control station 325 during connection to the network 420. The programming may include instructions to detect a fault condition and communicate an alarm signal in response to the fault condition.

The instrument 400 also may include a power module 425 (defined by the dot-dash line), which can be implemented by various portions such as, for example, a power control module 430 and a power supply 435. The power module 425 may receive, convert, control and/or supply power for the field device 300. For example, the power module 425 may convert bus power (shown as supplying current sources 440 and 445) supplied from the network 420 into power usable by the various components of the instrument 400 and, optionally, the sensor/actuator portion 305.

The power control module 430 may adjust the level of power supplied to the power supply 435 for use by the instrument 400. The power supply 435 (e.g., a shunt regulator) may include power regulation and noise reduction circuitry and may supply power in the form of current or voltage.

Bus power supply 340 may provide power in the form of current, which is distributed through the network 420 to the transmitters 400 of the field devices 205. The bus power may be regulated and supplied to the instrument 400 by current regulators 440 and 445. Conceptually, as shown in FIG. 4, the bus power may be shown to include a constant current regulator 440 (e.g., a quiescent current source) and an adjustable current regulator 445 that supply the power supply 435. The constant current regulator 440 and the adjustable current regulator 445 may be implemented by combined or separate circuitry, as will be discussed below with respect to FIGS. 5 and 6. The constant current regulator 440 may be set to meet a minimum power requirement of the field device 300, and the power control module 430 may adjust the level of the adjustable current regulator 445 to accommodate specific requirements of the instrument 400, such as, for example, additional functions processed by the processor unit 405.

Power module 425 (dot-dash outlined) and power control module 430 (dash outlined) are separately defined in FIG. 4 to illustrate possible distinctions between functions of, for example, a constant power level supply (e.g., in the case that a design standard requires a minimum power level be supplied to each instrument 400 of each field device 300) and a variable power supply. The instrument 400 also can be implemented as having a single adjustable power supply with a lower level limit.

As shown in FIG. 4, the power control module 430 may include a power rate change limiter 450 (e.g., a $\partial i/\partial t$ filter) for adjusting the power at a rate specified, for example, by a design standard so as not to cause interference (e.g., noise) on the network 420 supplying the bus power. Generally, the FOUNDATION™ Fieldbus communication protocol specifies that the current draw by a transmitter may not vary more than 1 mA/ms. Accordingly, the power rate change limiter 450 may control any increase or decrease of the power supplied to the power supply 435 to a rate of change within 1 mA/ms to satisfy this specified criteria. Furthermore, the power control module 430 may include an amplitude limiter 455. The amplitude limiter 455 may control the maximum overall or adjustable portion of the power level supplied to the power supply 455.

Moreover, the FOUNDATION™ Fieldbus protocol specifies, for example, that a device being connected to the bus should be operational and stable within 20 ms. This "initial power specification" allows the new device to be connected to the bus without affecting the communication that takes place continuously. Further, this specification would likely primarily affect the constant current regulator 440.

The instrument 400 may be implemented to adjust its own power supplied by the power supply 435 by controlling the power control module 430 using a software process. Alternatively, or additionally, the processor unit 405 may receive from the control station 325 a power control signal for adjusting the level of power supplied by the power supply 435 to the instrument 400. In either case, the processor unit 405 may control the level of power adjustment provided by the power control module 430 by outputting a control signal (e.g., a power control adjust signal) to the power control module 430 and receiving a feedback signal to more precisely control the power module 430. In one implementation, the power control adjust signal may be a pulse-width modulated signal.

Additionally, the instrument 400 may include a hardware detector/monitor 460 as shown in FIG. 4. The hardware detector/monitor 460 can monitor the addition or removal of hardware connected to the process control system. For example, an additional sensor (which will require more power to operate) can be attached to the instrument 400 (or attached to the bus but supplied with power from the instrument 400). The hardware detector/monitor 460 can detect the newly added sensor and immediately request that more power be appropriated to the instrument 400 by sending a signal to the power rate change limiter 450 to increase the power supplied by the power module 425. Also, a signal may be sent from the hardware detector/monitor 460 to the processor unit 405 to alert the processor unit 405 of the change in hardware and the request for change in power. Further, the hardware detector/monitor 460 can be manufactured as part of the instrument 400, or added at a later time (e.g., once the instrument 400 is installed in the process control system).

It should be understood that the components shown in FIG. 4 can be selectively removed, rearranged, grouped, combined, or supplemented with other components, as appropriate. Additionally, the instrument 400 may be modular, such that additional components (e.g., the hardware detector/monitor 460) can be added or removed in the field. Moreover, as discussed above with respect to FIG. 3, the instrument 400 can be supplied by its own power source (e.g., external power supply 335), as distinguished from the bus power current supplied from the network 420 as shown in FIG. 4. This separate power source can be implemented by a connection to a separate 24 VDC field power line.

Figure 5:
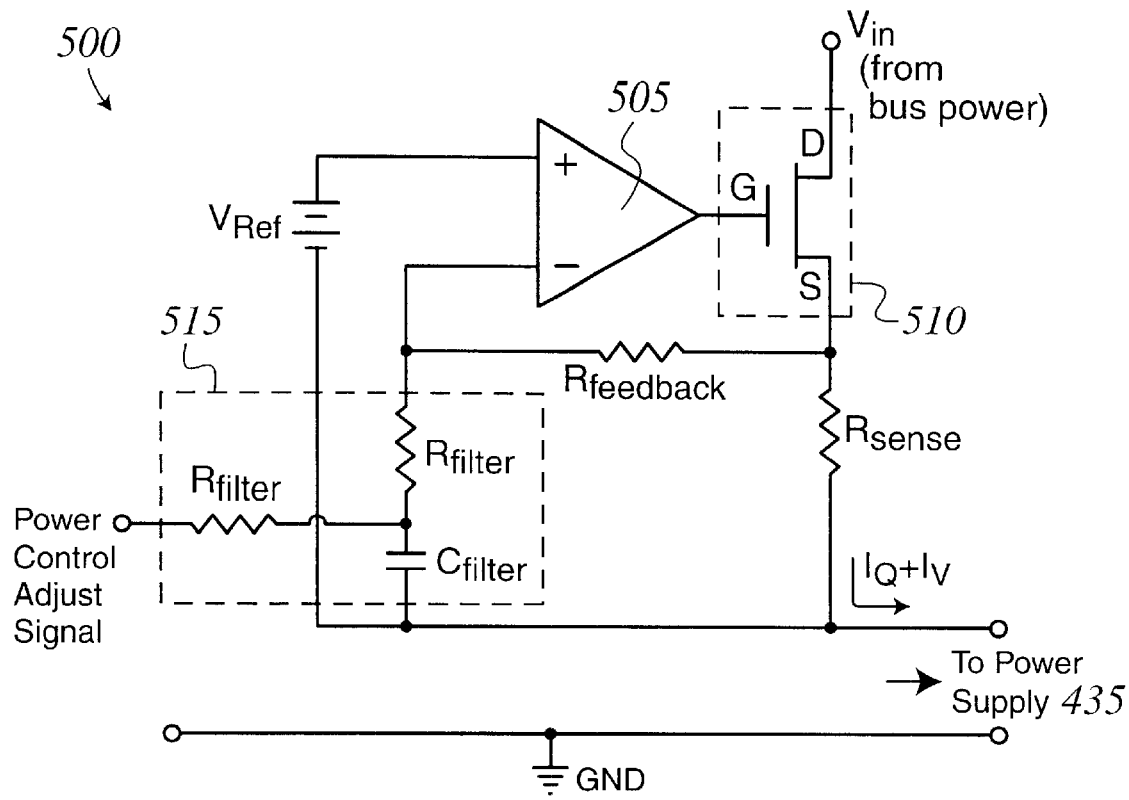
FIG. 5 is a circuit diagram of a variable power unit of the transmitter of FIG. 4.

FIG. 5 shows a current source 500 that is one implementation of the constant current regulator 440 and the adjustable current regulator 445 supplying the power supply 435. As depicted, an op amp 505 may control an n-channel enhanced MOSFET 510 having a drain D, a source S and a gate G. The op amp 505 may control the MOSFET 510 by sending an electrical signal to the gate G of the MOSFET 510. The MOSFET 510, when controlled to be "ON," may allow a current to pass through $R_{sense}$, as $R_{sense}$ is connected to the source S of the MOSFET 510 and $V_{in}$ (e.g., voltage from bus power of the network 420) is connected to the drain D of the MOSFET 510.

The voltage $V_{ref}$ may be a reference voltage applied to the positive input of the op amp 505. $V_{ref}$ can be a set voltage applied to the op amp 505 for controlling the op amp 505 to output at least a certain level of signal to control the MOSFET 510, which in turn may control at least a certain level of current (e.g., $I_Q$) to pass through the MOSFET 510. Controlling a certain amount of current to flow through the MOSFET 510 will cause a proportionate amount of current to flow through $R_{sense}$ and therefore to the power supply 435. The power supply 435 may be a shunt regulator for ultimately supplying power to the instrument 400.

The resistor $R_{feedback}$ may provide feedback to the negative input of the op amp 505, and is shown connected at one end between the source S of the MOSFET 510 and $R_{sense}$, and at the other end to the negative input of the op amp 505. The negative input of the op amp 505 also may be connected to a low pass filter 515, which may receive a power control adjust signal from the processor unit 405 through the power rate change limiter 450 and the amplitude limiter 455. The low pass filter 515 may include two resistors $R_{filter}$ and a capacitor $C_{filter}$, as shown. The power control adjust signal may be a pulse-width modulated (PWM) signal that, when passed through the low pass filter 515, becomes essentially a DC voltage value capable of adjustably controlling (with respect to the level of voltage supplied to the op amp 505 from $V_{ref}$ as a control signal) the output of the op amp 505, which in turn may control the current passing through the MOSFET 510 and therefore the current supplied to the power supply 435. Also, it should be noted that the power control adjust signal is not referenced to ground GND, but rather may be referenced to the high side of the power supply 435. As such, the signal applied to the negative input of the op amp 505 can be thought of as an offset signal with respect to the signal applied by $V_{ref}$ to the op amp 505.

As shown in FIG. 5, the quiescent operating current $I_Q$ (due to, for example, the control signal $V_{ref}$) of the instrument 400 is output along with the variable current $I_V$ (due to, for example, the power control adjust, or offset, signal) to the power supply 435. It should be noted that while $V_{ref}$ and therefore $I_Q$ will likely remain constant during operation of the instrument 400, the variable current $I_V$ may increase or decrease (depending on the offset signal applied to the negative input of the op amp 505) the overall level of current supplied to the power supply 435. Accordingly, the power control adjust signal may adjust the overall power available to the instrument 400.

Figure 6:
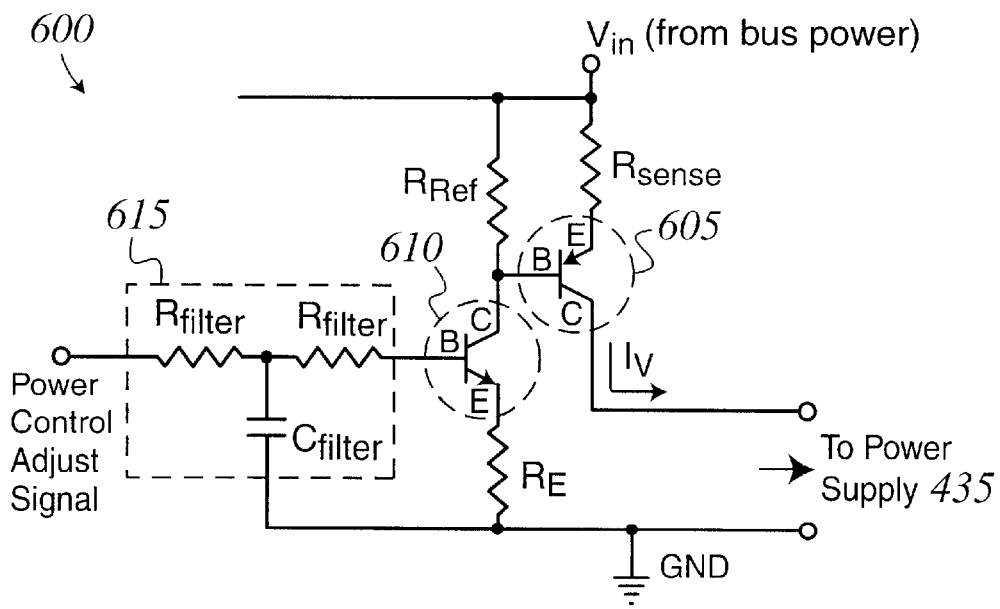
FIG. 6 is another circuit diagram of the variable power unit of the transmitter of FIG. 4.

Another simpler and less-precise implementation of the adjustable current regulator 445 that supplies the power supply 435 is shown in FIG. 6 as adjustable current source 600. As part of this implementation, it should be noted that the quiescent current $I_Q$ from the constant current regulator 440 is not shown. Indeed, the FOUNDATION™ Fieldbus communication protocol allows lower precision values from current sources to be supplied to power supplies of the field devices. As depicted in FIG. 6, $V_{in}$ (e.g., a voltage source from bus power of the network 420) may be connected through a resistor $R_{sense}$ and a PNP transistor 605 to supply a variable current level $I_V$ to the power supply 435. The transistor 605 has an emitter E, a base B and a collector C, and the resistor $R_{sense}$ may be connected between $V_{in}$ and the emitter E of the transistor 605. Further, the variable current $I_V$ may be controlled by and supplied to the power supply 435 by the collector C of the transistor 605.

The circuit of FIG. 6 may further include an NPN transistor 610 having a collector C, a base B and an emitter E. The sum of the voltage across $R_{sense}$ and $V_{BE}$ (the voltage between the base B and the emitter E of transistor 605) is equal to the voltage across $R_{ref}$. Also, a resistor $R_E$ may be connected between the emitter E of transistor 610 and ground GND. The voltage across $R_E$ may be approximately equal to the voltage across $R_{ref}$. As such, the transistor 605 may be controlled by an electrical signal determined by the voltage at the node between the collector C of transistor 610 and the resistor $R_{ref}$.

Similar to the diagram shown in FIG. 5, the power control adjust signal generated by the processor unit 405 (through the power rate change limiter 450 and the amplitude limiter 455) may be input to the adjustable current source 600 through a low-pass filter 615. The low pass filter 615 may include two resistors $R_{filter}$ and a capacitor $C_{filter}$, as shown. Again, the power control adjust signal may be a pulse-width modulated (PWM) signal that, when passed through the low pass filter 615, becomes essentially a DC voltage value capable of adjustably controlling the current into the base B of the transistor 610, which in turn may be directly related to the voltage across $R_E$, which itself may be directly related to the voltage across $R_{ref}$, as discussed above. As also discussed above, the voltage across $R_{ref}$ may control the current passing through the transistor 605 and therefore the current supplied to the power supply 435. Accordingly, the power control adjust signal may adjust the overall power available to the instrument 400.

It should be understood that many power control techniques, including current/voltage adjustment schemes, are well-known and can be implemented by many analog and digital circuit arrangements. Power control may also be accomplished by software processes. The circuits shown in FIGS. 5 and 6 are merely two implementations of analog current control circuitry. It should be understood that the analog circuitry shown in FIGS. 5 and 6 can be implemented by software in a DSP chip, or with digital circuitry. Additionally, various other circuitry components may be added to the circuits shown in FIGS. 5 and 6 (such as noise filters, and diodes to solve polarity problems), and the components shown in FIGS. 5 and 6 may be selectively removed, rearranged, grouped, combined, supplemented, or replaced with other components as appropriate.

Referring to FIG. 7, a task-power relationship chart 700 is shown. These relationships can provide a good estimate of the power that may be required by a particular transmitter, based on the number and types of functions (tasks) that the transmitter is running/processing. As can be seen, the changes in power can be software-related or hardware-related. For example, the chart 700 shows that a "1-second looped sensor reading update" function (shown at 705) may require 2 mW of power to process. A different rate of processing, such as the "0.5-second looped sensor reading update" (shown at 710) will require a different amount of power (in this case more power (3.5 mW) due to the increased sampling rate). Indeed, processing at a higher rate, in general, will require additional power (whether the processing involves sampling or performing calculations, etc.). Additionally, the transmitter may require 5 mW of power to transmit the data corresponding to the updated sensor reading over the network (shown at 715). Furthermore, updating the software (shown at 720), such as writing new software downloaded from the control station 325 to the flash memory 415, may require 4 mW of power.

Moreover, assigning the process control function to an instrument 400 (or several instruments) will require that the instrument 400 use more power to process the control functions of the process control system. The control of the process control system can be accomplished by an individual transmitter 400 or transmitters, for example, when there is no control station 325 associated with the process control system. Accordingly, processing the control function block (shown at 725) could require, for example, 10 mW of power. Also, adding additional hardware (shown at 730), and increasing the processing rate of different tasks (shown at 735) may require additional power as shown in FIG. 7.

It follows that once the number and types of functions being handled by a particular transmitter are known, the power consumption requirement of that transmitter can be estimated. Accordingly, the power supplied to the instrument 400 by the power module 425 can be adjusted (by adjusting, e.g., the power supplied by the power control module 430) to conform to the estimated power consumption requirement of that transmitter. This adjustment on a transmitter-by-transmitter basis, or an overall system basis, can provide an increase of power for transmitters performing heavy processing, and a decrease of power for transmitters performing light processing.

The task-power relationship data shown in chart 700 may be stored in the control station 325, the transmitters, or both. As such, the transmitters themselves may control the appropriate power supplied by the power module 425, or the control station 325 may control the appropriate power supplied by the power module 425 for each transmitter (e.g., by transmitting a power control signal addressed to individual transmitters for adjusting the power supplied by the power module 425). Moreover, calculations of power currently being used, power capacity, power availability, and desired power increases/decreases can be calculated by the control station 325, the transmitters 400, or both.

While the tasks shown in FIG. 7 may be independent of one another (thereby implying that the power required is additive), there may be tasks that can be processed in a symbiotic manner that reduces the overall power required to complete the combined tasks. Several types of tasks may be processed simultaneously or in a shared-resource manner that requires less power than processing the tasks individually. As such, different methods for calculating the reduced power consumption for resource-sharing tasks may be used to estimate the power required/used by a transmitter.

Figure 8A:
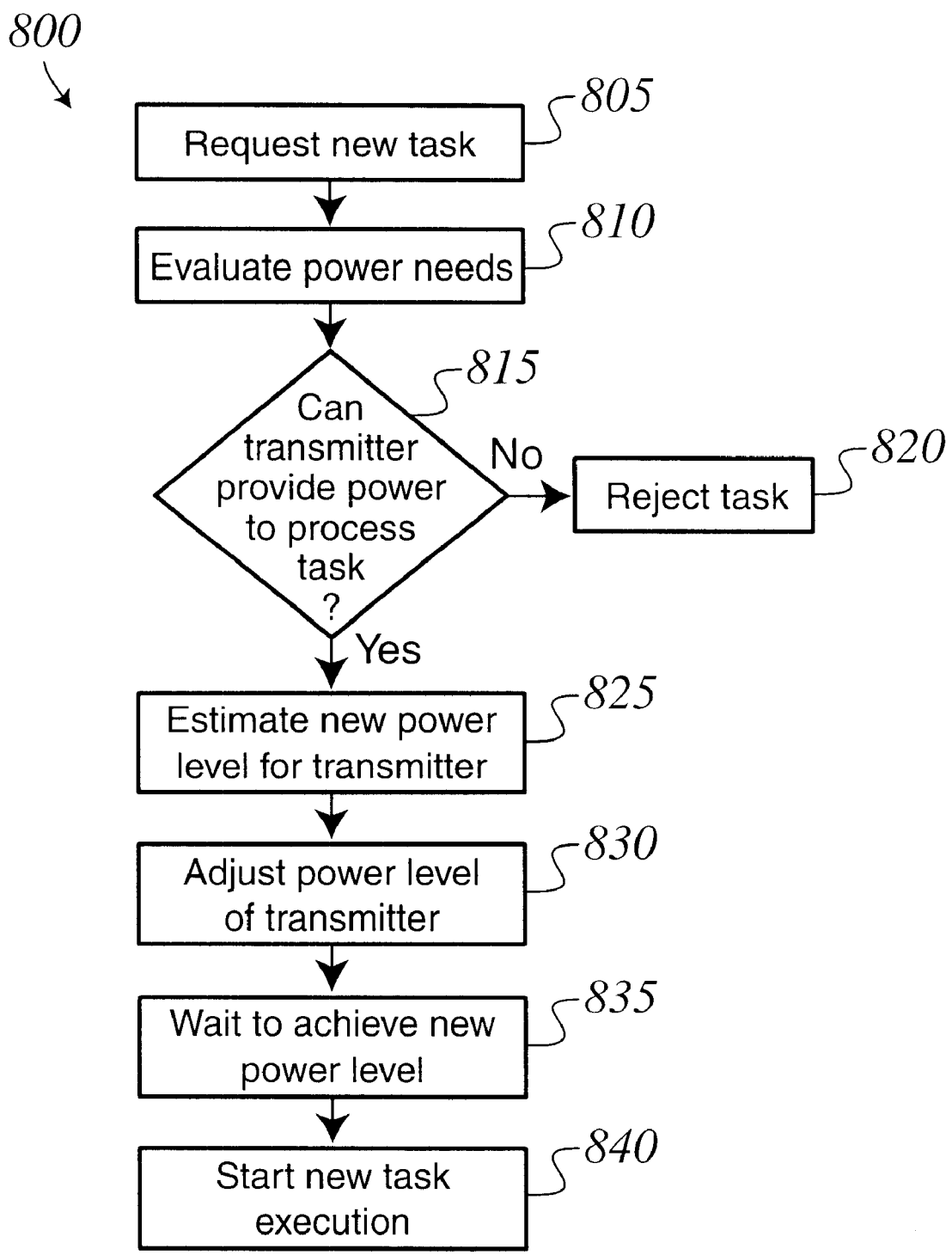
FIGS. 8A and 8B are flow charts of processes for managing power of a transmitter connected to a networked process control system.
Figure 8B:
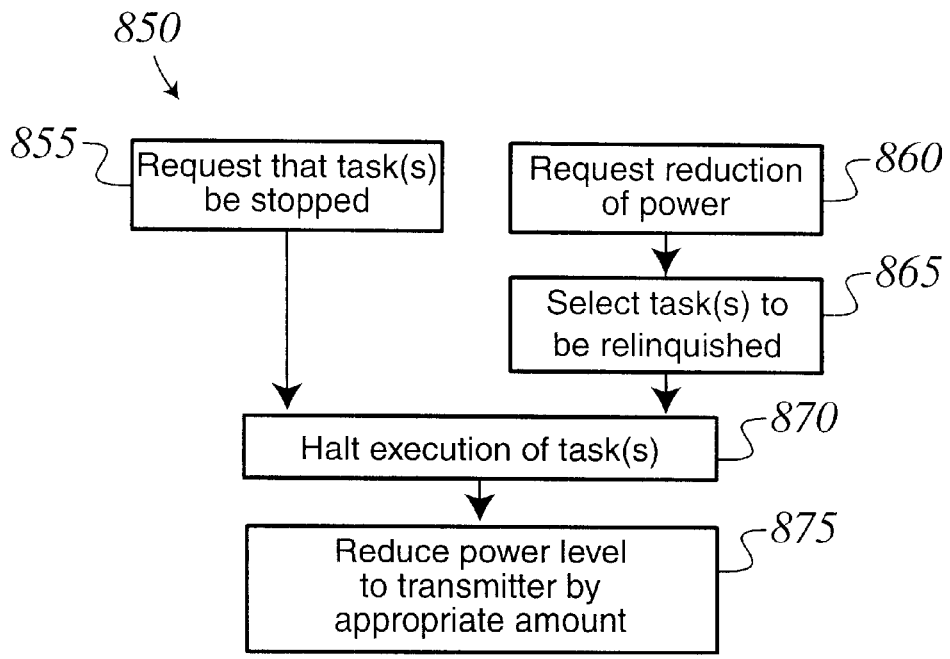

FIGS. 8A and 8B show processes 800, 850 for managing power of a field device transmitter (i.e., instrument 400). Referring to FIG. 8A, the instrument 400 or the control station 325 may request that a new function (or task) be processed by the instrument 400 (step 805). This may take place when an operator specifies increased control or monitoring of the process control system 200, or when functions from other transmitters are being redistributed.

Next, the power of the network branch 230 (or network 215), the power currently being consumed by the instrument 400, and the power needed to process the new function are determined (step 810). Note that the evaluation may determine hardware (e.g., power consumption to operate) and software (e.g., power consumption for processing) requirements. Then, it is determined whether the instrument 400 can provide the power to process the new task (step 815). If it is determined that the instrument 400 cannot provide the power to process the new task then the task may be rejected by the instrument 400 (step 820). For example, if the maximum power available on the network branch (i.e., spur) 230 is already allocated, then no more power is available to distribute to the instrument 400, and the task will be rejected because the instrument 400 cannot acquire the power to process the task. As another example, if the instrument 400 is currently processing certain tasks such that the instrument 400 cannot draw any more power (e.g., for capacity or safety reasons), then the task will be rejected by that instrument 400. More specifically, if the instrument 400 is designed, for example, to handle power adjustment in a range of between 20–30 mA drawn from the network bus power, and the instrument 400 is already operating (e.g., processing functions) at an amperage consumption of 29 mA, then an additional task may cause the current draw to exceed 30 mA and therefore should be rejected by that instrument 400.

If it is determined that power is available to process the new task in the instrument 400, then the task may be accepted and a new power level for the instrument 400 estimated (step 825). The new power level may be selected by using a process and a look-up table similar to the task-power relationship chart shown in FIG. 7, so that the power supplied to the instrument 400 can be increased to accommodate the estimated power necessary to process the new task. Once the new power is selected for the instrument 400, the power control module 430 adjusts the power supplied to the instrument 400 (step 830).

If the instrument 400 is designed to handle power level adjustment on its own, the processor unit 405 may calculate the power level adjustment and cause the power control module 430 to adjust the current supplied to the instrument 400 by the specified amount determined in step 825. Alternatively, the control station 325 may generate a power control signal corresponding to the power level adjustment amount necessary to achieve the new power level determined in step 825, and transmit the power control signal over the network 420 to the specific instrument 400. The processor unit 405, acting on the information from the power control signal, may cause the power control module 430 to adjust the power level (e.g., current) supplied to the power supply 435 of the instrument 400. As a result, the power available to the other field devices 205 may either decrease or increase, and may require the other field devices 205 to readjust their power needs in order to optimize power consumption.

For example, the processor unit 405 may cause the power control module 430 to increase the current supplied to the instrument 400 by the specified amount determined in step 825, whereby the current is increased at a rate in accordance with the power rate change limiter 450 (e.g., 1 mA/ms). As the rate of power change is limited, the power adjustment may take a period of time to complete. Accordingly, the instrument 400 may wait until the new power level has been reached before commencing execution of the new task (step 835). Once the new power level adjustment has been achieved, the instrument 400 may start processing the new task (step 840).

Referring to FIG. 8B, a corresponding power reduction process 850 (e.g., a "stop task and/or reduce power" request process) is shown. This process may be used, for example, when it is desirable or necessary to reduce the power available to the instrument 400, or when a function or task is being deleted from the transmitter (e.g., when the task is being reassigned to another instrument 400 or deleted altogether).

As such, the instrument 400 or the control station 325 may request that a certain function or task be deleted or transferred from the instrument 400 (step 855). Alternatively, the instrument 400 or the control station 325 may request that the power be reduced by a certain level (step 860), and a task (or tasks) may then be relinquished by selecting them for deletion or transfer from the instrument 400 (step 865).

In any case, processing of the task(s) involved (if any) is halted (step 870). Once the task is no longer being processed, the power available to the instrument 400 may be reduced (step 875). Similar to the process shown in FIG. 8A, the new reduced power level may be selected by using a process and a look-up table similar to that shown in FIG. 7, so that the power supplied to the instrument 400 can be reduced. Alternatively, if the decreased power level is already known (e.g., chosen in step 860), then the power available to the instrument 400 may be reduced to that level.

To reduce the power available to the instrument 400 to the new reduced power level, the power control module 430 may adjust the power supplied to the instrument 400 at a rate in accordance with the current/power rate change limiter (e.g., 1 mA/ms).

The process steps outlined in FIGS. 8A and 8B may be executed by the instrument 400, the control station 325, a portable controller hooked to the network 420, or any combination thereof. Additionally, the process steps may be selectively repeated, skipped, removed, rearranged, grouped, combined, nested-looped, supplemented with other steps, placed into subroutines, or randomized, as appropriate.

Figure 9:
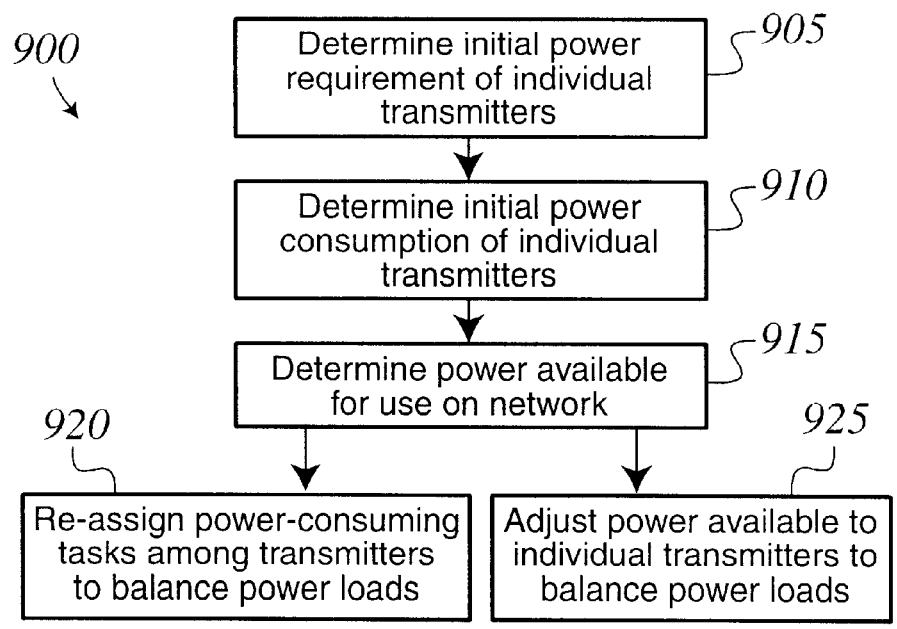
FIG. 9 is a flow chart of a process for improving the distribution of power and/or power-consuming functions among instruments connected to the network of a process control system.

Referring to FIG. 9, the distribution of power and/or power-consuming functions among transmitters 400 connected to the network 215 of a process control system 200 may be improved according to a procedure 900. As discussed above, optimizing the power distribution and/or the power-consuming functions of the process control system 200 can improve the efficiency and capability of the process control system 200 without penalizing the power budget for standard operation. In other words, a device connected to the network need not be specifically designed for a minimum power consumption necessary for performing all the tasks that may be assigned to it at any given time. Power and/or power-consuming functions may be re-distributed as needed to accommodate specific needs of certain transmitters 400 and to optimize power consumption across the network 215 or a network branch 230.

Optimizing the distribution of power and/or power-consuming functions among transmitters 400 may begin by determining an initial power requirement of the transmitters 400 connected to the network 215 or a network branch 230 (step 905). Determining an initial power requirement may be achieved by polling each instrument 400 connected to the network 215 or a network branch 230 to determine the power requirement of the instrument 400 based on functions or tasks needed to be performed. As previously discussed, each instrument 400 may be identifiable by a unique address. Polling may be initiated by the control station 210 or any instrument 400 having the capability to perform the process for optimizing the distribution of power and/or power-consuming functions among transmitters. Alternatively, the initial power requirement may be determined by accessing a schedule of the power-consuming tasks of all the transmitters 400 connected to the network 215. The schedule of tasks may be maintained by the control station 210 or another storage and/or processing device associated with the process control system 200.

The control station 210 or any instrument 400 having the capability to perform the process for optimizing the distribution of power and/or power-consuming functions among transmitters then may determine an initial (i.e., prior to optimization) power consumption of all the field devices 205 connected to the network 215 or a network branch 230 (step 910). Determining the initial power consumption may be achieved by polling the transmitters 400 connected to the network 215 or a specific network branch 230 to determine how much power is currently being consumed by each instrument 400. For example, each instrument 400 may have power level detection circuitry capable of determining its power consumption level. This information will be useful in determining which transmitters 400 are currently capable of consuming more power (e.g., within a rated amount) to perform additional tasks, and which transmitters 400 may be consuming power near (or more than) maximum specified levels. Additionally, the power consumed by the resistance of the wires (i.e., line losses) comprising the physical network 215 may be determined, in order to more accurately assess the power consumption across the network 215.

Next, the available power supplied by, for example, the network power supply 220 or the power barrier 225 may be determined (step 915). The results of this step allow determination of the maximum power available for distribution among the transmitters 400 connected to the network 215 or the network branch 230, as well as the net unused power, if any, available for distribution.

Once the initial power requirement and the initial power consumption (e.g., load or draw) of the transmitters 400 of interest, and the power available to the network 215 or the network branch 230, are determined, the re-distribution of power and/or power-consuming functions among transmitters 400 connected to the network 215 may begin.

For example, the power-consuming tasks may be reassigned (i.e., taken from one transmitter and assigned to another transmitter) to optimally balance the power load(s) among the transmitters 400 across the network 215 (step 920). This can be controlled by the control station 210 or any capable instrument 400. The actual process may include upgrading software of one instrument 400 to decrease the number of tasks processed by its processing unit 405, and upgrading software of another instrument 400 to increase the number of tasks processed by its processing unit 405.

In another power management method, the power control modules 430 of the transmitters 400 may be controlled (e.g., by the control station 210 or any capable instrument 400) to adjust the power available to the individual transmitters 400 so the power loads may be distributed in a system-balancing manner among the process control devices connected to the network 215 (step 925). This may involve giving up power (e.g., controlling the power control module 430 to decrease the power sent to the power supply 435 of the instrument 400) currently allocated to transmitters 400 that do not require this "spare" power.

It should be understood that steps 905–925 may be separately performed or combined to achieve optimal power management of the individual transmitters 400 and the process control system. Additionally, the process steps shown in FIG. 9 may be selectively repeated, skipped, removed, rearranged, grouped, combined, nested-looped, supplemented with other steps, placed into subroutines, or randomized, as appropriate.

Additionally, the power management processes discussed above and shown, for example, in FIGS. 8A, 8B and 9 can be performed during initial configuration of the process control system, or while the process control system is operating. Indeed, the power management processes can be performed when an additional field device 205 or network branch 230 is introduced into the process control system, or when an existing field device 205 or network branch 230 is replaced.

In view of the above discussions, it can be seen that individual control of the power consumed by individual transmitters connected to the network of a process control system may allow certain transmitters to, for example, process additional functions with respect to the process control system. Moreover, with respect to the overall process control system, the individual control of the power consumed by individual transmitters connected to the network may allow, for example, the power supplied to the process control system to be optimally distributed among the devices connected to the network.

In certain situations, the field devices 205 may require additional power. For example, if a process engineer needs a particular sensor-type device such as a temperature sensor to provide more accurate readings or a greater sampling of readings, or a particular actuator-type device such as a valve positioner to provide greater control, then the particular device 205 can be adjusted to perform the additional power-consuming function or task. As a more-detailed example, if a valve positioner device is adjusted to perform a greater degree of control, then additional software blocks may be required to be downloaded to the device 205 and run by the instrument 400 of the device 205. The greater degree of control also may require an increase in the clock rate of the clock generator 410 of the instrument 400. Accordingly, the downloading/upgrading of software, the processing of additional software blocks, and the increased clock rate will all likely require additional power.

For example, additional power may be required when software in the instrument 400 of the device 205 is modified (e.g., upgraded, downloaded, or programmably adjusted). Accordingly, the control station 210 may output a power adjustment signal to the particular device 205 whose software is being modified. The power adjustment signal may cause the instrument 400 to increase the output of the power control module 430 (e.g., temporarily while the software is being upgraded, or indefinitely to accommodate the processing of additional tasks) within the parameters of the power rate change limiter 450 and the amplitude limiter 455. The power level supplied to the instrument 400 may be increased by a set amount determined by, for example, a fixed value, a value chosen by an operator or software at the control station 210, or a value determined by the instrument 400 in accordance with its present power needs.

Occasionally, when the additional power-consuming service (e.g., software upgrade) would require more power than is currently available as spare power, some of the other field devices 205 may be required to reduce their power consumption to free up more power for the device(s) 205 performing the additional power-consuming service.

The adjustment (i.e., power reduction/increase and sensing/control adjustments) to the field device 205 may be performed in the field by a technician using a handheld or portable field controller. Alternatively, the field device 205 may be adjusted by a power adjustment signal sent by a control station 210. Furthermore, the adjustment may take place using power management software downloaded from the control station 210, whereby the software can be stored in the instrument 400 of the field device 205.

Given the possibility that only a finite amount of power is available from the power supply 220 (or power supplies 220, or power barriers 225) of the network 215, it may be desirable to optimize the power consumption loads of the field devices 205. Each field device 205 and each physical wired segment of the network 215 will likely consume power. Since each configuration of a process control system 200 will likely be unique (due to, e.g., number of field devices 205, placement of field devices 205, etc.), balancing the power loads of the process control system 200 can lead to greater efficiencies in the control of the process. Accordingly, more field devices 205 may be added to existing installations without adversely affecting power consumption levels or reconfiguring the entire network 215.

Figure 10:
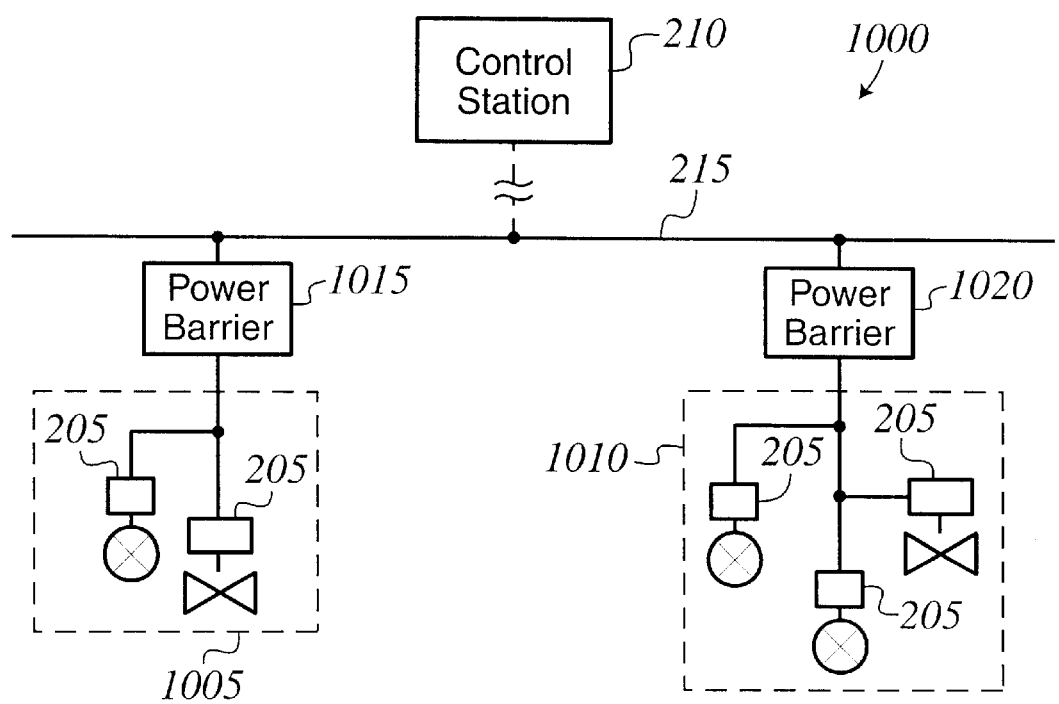
FIG. 10 is a diagram showing one configuration of a networked process control system for which power loads may be optimized.

Referring to FIG. 10, a configuration of a networked process control system 1000 that may require balancing of its power loads is shown. The process control system 1000 may include a network 215 and a control station 210. Further, the process control system 1000 may include a network branch 1005 having a power barrier 1015 and two field devices 205 connected to it, and a network branch 1010 having a power barrier 1020 and three field devices 205 connected to it. If the power barriers 1015, 1020 supply the same, limited amount of power to each of network branches 1005, 1010, and each of the transmitters of the field devices 205 connected to the network branches 1005, 1010 normally (before optimization) consume the same amount of power, then the power load of the network branch 1010 is greater than the power load of the network branch 1005.

Generally, for any instrument 400 of the field devices 205, a number of functions are processed by the processor unit 405, as discussed above. As such, if a first transmitter processes more functions (e.g., software blocks) than a second transmitter, the first transmitter likely must operate faster, possibly requiring a higher clock rate to process more parameters and transmit the data corresponding to those parameters over the network 215 (since the bus communication rate may not change), or at least for a longer period of time. These increases in processing duties and a higher clock rate generally require more power. Furthermore, sending a greater amount of data over the network 215 may require a higher bandwidth and therefore additional power will likely be required. Accordingly, a instrument 400 may require more or less power depending on the number and type of functions it is required to process.

As such, it may be desirable to optimize the loads of the power barriers 1015, 1020 and the transmitters by putting more process control functions (e.g., software processes) in the transmitters of the field devices 205 connected to the network branch 1005 and less process control functions in the transmitters of the field devices 205 connected to the network branch 1010. Accordingly, more power will be used in the individual field devices 205 connected to the network branch 1005 than in the individual field devices 205 connected to the network branch 1010, and thus, the power loads of network branches 1005, 1010 may be more balanced with respect to each other.

Furthermore, there may be process control tasks (e.g., software functions) that can be performed by any of the field devices 205. These process control tasks may not need to be performed by all the field devices 205. As such, these process control tasks may be assigned to field devices 205 that consume less power than other field devices 205, or to field devices 205 on network spurs that have more power to spare (because the field devices 205 may use more power to perform these additional software functions).

Figure 11:
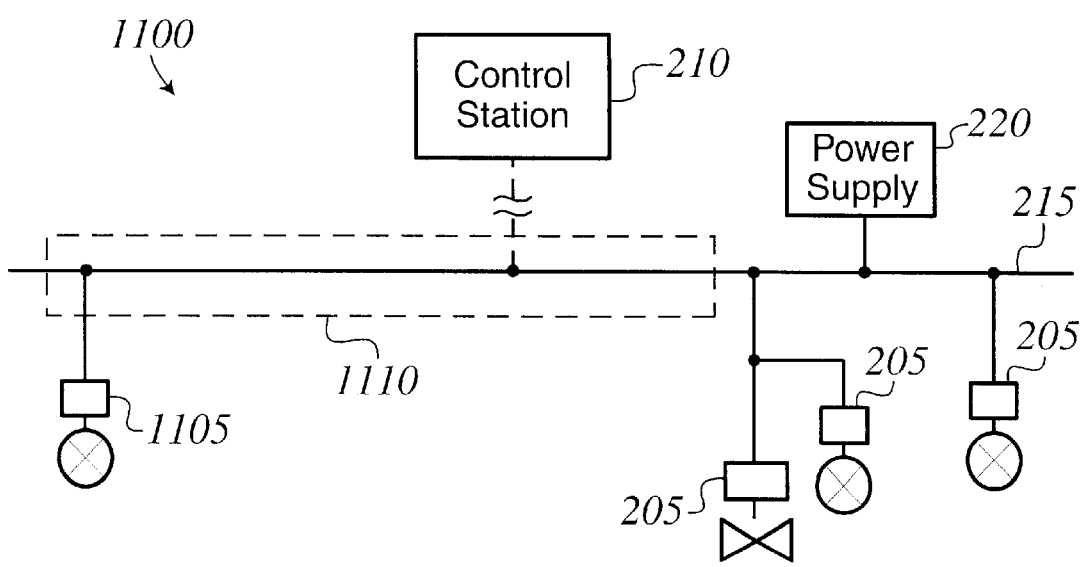
FIG. 11 is a diagram showing another configuration of a networked process control system for which power loads may be optimized.

Referring to FIG. 11, another implementation of a configuration of a networked process control system 1100 that may require balancing of its power loads is shown. Another situation that may require optimizing the power loads occurs when, for example, a distant device 1105 is located very far from the power supply 220 or the control station 210 compared to the other proximate field devices 205, thereby requiring more power to overcome the line losses in the longer section 1110 of the network 215. One method of overcoming this problem is to remove certain process functions from the distant device 1105, thereby decreasing its power requirement and consumption. The process functions removed from the distant device 1105 can be assigned (within maximum power ratings) to the proximate field devices 205 to optimize the power loads on the process control system 1100.

It should be understood that the power balancing situations described with respect to FIGS. 10 and 11 may be coordinated with the power management techniques discussed above, in particular with respect to FIGS. 8A, 8B and 9. Accordingly, power supplied to individual transmitters may be controlled to balance, for example, the needs of individual transmitters or the needs of the overall process control system (or portions thereof).

In order to realize the full potential of the field devices 205 and the process control system, it is desirable to minimize power consumption in the field devices 205. By minimizing power consumption, more field devices 205 can be included on one multi-drop cable having a maximum power limit per spur. Furthermore, the average power consumption may be minimized by adding features that consume power only as needed, after initial start-up of the field devices 205. Such features may include, for example, the ability to reprogram the instrument 400 (e.g., reprogramming a FOUNDATION™ Fieldbus Media Access Unit found in some field devices designed according to the FOUNDATION™ Fieldbus standard), the ability to add computational blocks (e.g., transmitter functions) beyond the minimum set, and the ability to increase the transmitter throughput rate by increasing the clock rate of the processor unit 405. These features may increase the power consumption for only a brief time during the feature transaction, or for an indefinite amount of time while the field device 205 is in service. The power of the field device 205 may be controlled once initial power is applied to the field device 205 and communication is established with the field device 205. The FOUNDATION™ Fieldbus standard stipulates only that the current consumed by the field device 205 come up to quiescent value within a specified time (after start-up) and change thereafter at no more than a specified slow rate (e.g., about 1 mA/ms) compared with the communications current modulation. Accordingly, the power can be adjusted as described above to achieve a level consistent with the added features as long as the power is adjusted in the manners discussed above.

While several implementations have been shown and described with reference to the drawings, it should be understood by those skilled in the art that various modifications in form and detail may be made within the scope of the following claims. For example, the power supplied to the transmitter 400 could be a power supply that is separate from and external to the process control system, but the power supply may still have limitations with respect to the power available and the power distributable and usable by the transmitter 400. Accordingly, the variable power features described herein would be applicable and advantageous to a system with such an external limited power supply. Moreover, the variable power features described herein are applicable to systems using any type of power supply method (e.g., voltage and current) and any type of power distribution/transmission method (e.g., two-wire, bus, cable and optical cable).

What is claimed is:

1. A process control instrument comprising:
   a sensor/actuator portion;
   a transmitter portion connected to the sensor/actuator portion and operable to communicate with other process variable transmitters through a communication network, wherein the transmitter portion includes:
      a processing module; and
      a power module operable to generate a power output, wherein the power module is operable to adjust the power output supplied to at least the transmitter portion based on a power control signal.

2. The process control instrument of claim 1 wherein the power control signal is generated by a controller remote from the process control instrument and communicated to the process control instrument over the communication network.

3. The process control instrument of claim 1 wherein the power module comprises a power control module for adjusting the power output.

4. The process control instrument of claim 3 wherein the power control module comprises:
   a limiter operable to limit a power input to the process control instrument according to a controllable limit; and
   a power rate of change unit operable to limit a rate of change of the power input to the process control instrument according to a controllable adjustment rate limit.

5. The process control instrument of claim 4 wherein the controllable limit is automatically controlled by software.

6. The process control instrument of claim 4 wherein the controllable limit is controlled by human intervention.

7. The process control instrument of claim 4 wherein the controllable limit is automatically controlled by circuitry.

8. The process control instrument of claim 4 wherein the controllable adjustment rate limit is automatically controlled by software.

9. The process control instrument of claim 4 wherein the controllable adjustment rate limit is controlled by human intervention.

10. The process control instrument of claim 4 wherein the controllable adjustment rate limit is automatically controlled by circuitry.

11. The process control instrument of claim 4 wherein the controllable adjustment rate limit equals 1 mA/ms.

12. The process control instrument of claim 1 wherein the power output of the power module is an electric current supplied to at least the transmitter portion of the process control instrument.

13. The process control instrument of claim 1 wherein:
the communication network comprises a hard-wired communication pathway operable to supply a bus power to the power module, and
the power module uses the bus power as a source for the power output.

14. The process control instrument of claim 13 wherein the hard-wired communication pathway is configured in a bus-with-spurs topology.

15. The process control instrument of claim 13 wherein the hard-wired communication pathway is configured in a daisy-chain topology.

16. The process control instrument of claim 13 wherein the hard-wired communication pathway is configured in a tree topology.

17. The process control instrument of claim 13 wherein the hard-wired communication pathway is configured in a point-to-point topology.

18. A process control system comprising:
process control instruments, each of which includes a power control module that controls a maximum available power level for the process control instrument, wherein the power control module is operable to adjust the maximum available power level for the process control instrument based on a power control signal;
a communication network electrically connected to the process control instruments and operable to conduct communication signals among the process control instruments; and
a power supply operable to supply power to the process control instruments through the communication network.

19. The process control system of claim 18 further comprising a control station operable to generate the power control signal and control power distribution among the process control instruments.

20. The process control system of claim 19 wherein the control station is further operable to determine power loads of the process control instruments and distribute functions among the process control instruments to balance the power loads of the process control instruments.

21. The process control system of claim 20 wherein the control station distributes functions among the process control instruments to balance power consumption among at least one of individual process control instruments, groups of process control instruments, and segments of the communication network.

22. The process control system of claim 19 wherein the control station is further operable to control power distribution of a limited quantity of power among the process control instruments.

23. The process control system of claim 18 wherein the power control module comprises:
an amplitude limiter operable to limit the available power level of the process control instrument according to a controllable amplitude limit; and
a power rate of change unit operable to limit a rate of change of the available power level of the process control instrument according to a controllable adjustment rate limit.

24. The process control system of claim 23 wherein the controllable amplitude limit is automatically controlled by software.

25. The process control system of claim 23 wherein the controllable amplitude limit is controlled by human intervention.

26. The process control system of claim 23 wherein the controllable amplitude limit is automatically controlled by circuitry.

27. The process control system of claim 23 wherein the controllable adjustment rate limit is automatically controlled by software.

28. The process control system of claim 23 wherein the controllable adjustment rate limit is controlled by human intervention.

29. The process control system of claim 23 wherein the controllable adjustment rate limit is automatically controlled by circuitry.

30. The process control system of claim 23 wherein the controllable adjustment rate limit equals 1 mA/ms.

31. The process control system of claim 18, wherein the power control module supplies electric current to the process control instrument.

32. The process control system of claim 18 wherein:
the communication network comprises a hard-wired communication pathway operable to supply a bus power to the power control module, and
the power control module uses the bus power as a source for the available power level.

33. The process control system of claim 32 wherein the hard-wired communication pathway is configured in a bus-with-spurs topology.

34. The process control system of claim 32 wherein the hard-wired communication pathway is configured in a daisy-chain topology.

35. The process control system of claim 32 wherein the hard-wired communication pathway is configured in a tree topology.

36. The process control system of claim 32 wherein the hard-wired communication pathway is configured in a point-to-point topology.

37. A process control system power management method, comprising:
determining initial power requirements of power-consuming functions distributed among process control instruments which are electrically connected together by a network;
determining initial power loads of the process control instruments;
determining an available power level supplied by a power supply connected to the network; and
distributing the power-consuming functions among the process control instruments, based on at least one of the initial power requirements, the initial power loads, and the available power level, to balance power loads among the process control instruments.

38. The process control system power management method of claim 37 wherein distributing the power-consuming functions among the process control instruments is achieved using a control station connected to the network.

39. The process control system power management method of claim 37 further comprising determining line losses of network branches connecting the process control instruments.

40. The process control system power management method of claim 39 wherein distributing the power-consuming functions among the process control instruments is further based on the line losses of the network branches.

41. The process control system power management method of claim 37 wherein distributing the power-consuming functions among the process control instruments comprises producing a balance of the power loads with respect to individual process control instruments.

42. The process control system power management method of claim 37 wherein distributing the power-consuming functions among the process control instruments comprises producing a balance of the power loads with respect to segments of the network.

43. The process control system power management method of claim 37 wherein distributing the power-consuming functions among the process control instruments comprises producing a balance of the power loads with respect to a limited amount of power supplied by the power supply.

44. A process control system power management method comprising:
    determining initial power requirements of power-consuming functions distributed among process control instruments which are electrically connected together by a network;
    determining initial power loads of the process control instruments;
    determining an available power level supplied by a power supply connected to the network; and
    controlling power control modules associated with the process control instruments, based on at least one of the initial power requirements, the initial power loads, and the available power level, to adjust a power level available to individual process control instruments and to balance power loads among the process control instruments.

45. The process control system power management method of claim 44 wherein controlling the power control modules associated with the process control instruments is achieved using a control station connected to the network.

46. The process control system power management method of claim 44 further comprising determining line losses of network branches connecting the process control instruments.

47. The process control system power management method of claim 46 wherein controlling the power control modules associated with the process control instruments is further based on the line losses of network branches.

48. The process control system power management method of claim 44 wherein controlling the power control modules associated with the process control instruments comprises producing a balance of the power loads with respect to individual process control instruments.

49. The process control system power management method of claim 44 wherein controlling the power control modules associated with the process control instruments comprises producing a balance of the power loads with respect to segments of the network.

50. The process control system power management method of claim 44 wherein controlling the power control modules associated with the process control instruments comprises producing a balance of the power loads with respect to a limited amount of power supplied by the power supply.

51. A process control system power management method, comprising:
    determining at least one of: initial power requirements of power-consuming functions distributed among process control instruments which are connected by a network, initial power loads of the process control instruments, and an available power level supplied by a power supply connected to the network; and
    distributing the power-consuming functions among the process control instruments, based on at least one of the initial power requirements of the power-consuming functions the initial power loads of the process control instruments, and the available power level supplied by the power supply, to balance power loads among the process control instruments.

52. The process control system power management method of claim 51, further comprising:
    determining the initial power requirements of the power-consuming functions distributed among the process control instruments which are connected by a network;
    determining the initial power loads of the process control instruments; and
    determining the available power level supplied by a power supply connected to the network.

53. The process control system power management method of claim 51 wherein distributing the power-consuming functions includes using a control station connected to a network, which connects the process control instruments for distributing the power-consuming functions among the process control instruments.

54. The process control system power management method of claim 51 further comprising determining line losses of network branches connecting the process control instruments.

55. The process control system power management method of claim 54 wherein distributing the power-consuming functions among the process control instruments is further based on the line losses of the network branches.

56. The process control system power management method of claim 51 wherein distributing the power-consuming functions among the process control instruments comprises producing a balance of the power loads with respect to individual process control instruments.

57. The process control system power management method of claim 51 wherein distributing the power-consuming functions among the process control instruments comprises producing a balance of the power loads with respect to segments of a network to which the process control instruments are connected.

58. The process control system power management method of claim 51 wherein distributing the power-consuming functions among the process control instruments comprises producing a balance of the power loads with respect to a limited amount of power supplied by a power supply.

59. A process control system power management method comprising:
    determining at least one of: initial power requirements of power-consuming functions distributed among process control instruments which are connected together by a network, initial power loads of the process control instruments, and an available power level supplied by a power supply connected to the network; and controlling power control modules associated with the process control instruments, based on at least one of the initial power requirements of the Power-consuming functions the initial power loads of the process control instruments, and the available power level supplied by the power supply, to adjust a power level available to each of the process control instruments and to balance power loads among the process control instruments.

60. The process control system power management method of claim 59, further comprising:

determining the initial power requirements of power-consuming functions distributed among the process control instruments which are connected together by a network;

determining the initial power loads of the process control instruments; and determining the available power level supplied by a power supply connected to the network.

61. The process control system power management method of claim 59 wherein controlling the power control modules includes using a control station connected to a network, which connects the process control instruments for controlling the power control modules associated with the process control instruments.

62. The process control system power management method of claim 59 further comprising determining line losses of network branches connecting the process control instruments.

63. The process control system power management method of claim 62 wherein controlling the power control modules includes using the line losses of the network branches for controlling the power control modules associated with the process control instruments.

64. The process control system power management method of claim 59 wherein controlling the power control modules associated with the process control instruments comprises producing a balance of the power loads with respect to individual process control instruments.

65. The process control system power management method of claim 59 wherein controlling the power control modules associated with the process control instruments comprises producing a balance of the power loads with respect to segments of the network.

66. The process control system power management method of claim 59 wherein controlling the power control modules associated with the process control instruments comprises producing a balance of the power loads with respect to a limited amount of power supplied by a power supply.

* * * * *